(12) United States Patent
Choe et al.

(10) Patent No.: US 8,817,700 B2
(45) Date of Patent: Aug. 26, 2014

(54) METHOD AND SYSTEM FOR PREVENTING USE OF STOLEN TERMINAL THROUGH FORCED LOCATION RE-REGISTRATION

(75) Inventors: Chong-Youn Choe, Seoul (KR); Jeon-Il Choi, Seoul (KR); Nak-Po Kim, Seoul (KR)

(73) Assignee: KT Corporation, Gyeonggi-do (KR)

( * ) Notice: Subject to any disclaimer, the term of this patent is extended or adjusted under 35 U.S.C. 154(b) by 265 days.

(21) Appl. No.: 12/808,866

(22) PCT Filed: Dec. 17, 2008

(86) PCT No.: PCT/KR2008/007455
§ 371 (c)(1),
(2), (4) Date: Jun. 17, 2010

(87) PCT Pub. No.: WO2009/078657
PCT Pub. Date: Jun. 25, 2009

(65) Prior Publication Data
US 2011/0122813 A1    May 26, 2011

(30) Foreign Application Priority Data
Dec. 18, 2007    (KR) ........................ 10-2007-0133457

(51) Int. Cl.
*H04Q 7/20* (2006.01)
(52) U.S. Cl.
USPC ........................................................... 370/328
(58) Field of Classification Search
CPC ....................................................... H04Q 7/20
USPC ....................................................... 370/328
See application file for complete search history.

(56) References Cited

U.S. PATENT DOCUMENTS 6,233,458 B1 *   5/2001   Haumont et al. ............. 455/445
6,389,283 B1 *   5/2002   Sanchez Herrero .......... 455/433

(Continued)

FOREIGN PATENT DOCUMENTS

CN          1625291 A       6/2005
KR   10-2000-0060342 A     10/2000

(Continued)

OTHER PUBLICATIONS

International Search Report with Written Opinion, dated Aug. 5, 2009, received in International Patent application No. PCT/KR2008/007455, 7 pgs.

(Continued)

*Primary Examiner* — John Blanton
*Assistant Examiner* — Jay P Patel
(74) *Attorney, Agent, or Firm* — IP Legal Services, LLC

(57) ABSTRACT

Provided are a method and system for preventing the use of a stolen terminal when the stolen terminal registers its location again by making it inevitable for the stolen terminal to register its location again to be used. The method includes: receiving information that a user terminal was stolen; making a mobile application part (MAP) cancel location request to a mobile switching center (MSC) or a serving general packet radio service support node (SGSN) after receiving the information that the user terminal was stolen; and checking whether the user terminal is a stolen terminal when receiving a location registration approval request from the user terminal after performing a MAP cancel location process by deleting subscriber information of the user terminal from the MSC or the SGSN in response to the MAP cancel location request.

20 Claims, 5 Drawing Sheets

(56) References Cited

U.S. PATENT DOCUMENTS

| | | | |
|---|---|---|---|
| 6,625,155 B1* | 9/2003 | Dziong | 370/395.2 |
| 6,711,147 B1* | 3/2004 | Barnes et al. | 370/338 |
| 6,955,918 B2* | 10/2005 | Haumont et al. | 455/436 |
| 7,058,402 B2* | 6/2006 | Karlsson et al. | 455/433 |
| 7,171,209 B2* | 1/2007 | Numminen et al. | 455/445 |
| 7,286,852 B2* | 10/2007 | Imura | 455/558 |
| 7,460,553 B2* | 12/2008 | Riveiro Insua et al. | 370/437 |
| 7,584,201 B2* | 9/2009 | Casey | 1/1 |
| 7,668,253 B2* | 2/2010 | Hwang et al. | 375/295 |
| 2002/0133589 A1* | 9/2002 | Gubbi et al. | 709/225 |
| 2002/0177439 A1* | 11/2002 | Karlsson et al. | 455/433 |
| 2003/0013446 A1* | 1/2003 | Haumont et al. | 455/436 |
| 2004/0066740 A1* | 4/2004 | Suh et al. | 370/208 |
| 2004/0136393 A1* | 7/2004 | Riveiro Insua et al. | 370/432 |
| 2004/0180664 A1* | 9/2004 | Numminen et al. | 455/445 |
| 2004/0185880 A1* | 9/2004 | Ham et al. | 455/462 |
| 2005/0143059 A1* | 6/2005 | Imura | 455/419 |
| 2005/0195909 A1* | 9/2005 | Hwang et al. | 375/260 |
| 2005/0240972 A1* | 10/2005 | Zhang et al. | 725/81 |
| 2005/0280557 A1* | 12/2005 | Jha et al. | 340/988 |
| 2005/0282538 A1* | 12/2005 | Balon et al. | 455/423 |
| 2006/0039318 A1* | 2/2006 | Oh et al. | 370/328 |
| 2006/0272020 A1* | 11/2006 | Gardner | 726/23 |
| 2006/0276175 A1* | 12/2006 | Chandran | 455/411 |
| 2007/0072587 A1* | 3/2007 | Della-Torre | 455/410 |
| 2007/0173229 A1* | 7/2007 | Dong et al. | 455/411 |
| 2007/0178881 A1* | 8/2007 | Teunissen et al. | 455/410 |
| 2007/0249322 A1* | 10/2007 | Benco et al. | 455/410 |
| 2008/0056187 A1* | 3/2008 | Soong et al. | 370/330 |
| 2008/0076459 A1* | 3/2008 | Shaju | 455/466 |
| 2010/0064344 A1* | 3/2010 | Wang | 726/3 |
| 2010/0111060 A1* | 5/2010 | Olsson et al. | 370/338 |
| 2011/0282999 A1* | 11/2011 | Teague et al. | 709/226 |

FOREIGN PATENT DOCUMENTS

| | | |
|---|---|---|
| KR | 10-2001-0058550 A | 7/2001 |
| KR | 10-2003-0087691 A | 11/2003 |
| KR | 10-2004-0041195 A | 5/2004 |

OTHER PUBLICATIONS

European Patent Office, European Search Report for EP Application No. 08 86 1052, May 22, 2012.

Asha Mehrotra et al., "Mobility and Security Management in the GSM System and Some Proposed Future Improvements", Proceedings of the IEEE, Jul. 1, 1998, pp. 1480-1497, vol. 86, No. 7.

"3rd Generation Partnership Project; Technical Specification Group Services and System Aspects; GPRS enhancements for E-UTRAN access (Release 8)", 3GPP Standard; 3GPP TS 23.401 V2.0.0, Dec. 1, 2007, pp. 1-168, 3rd Generation Partnership Project (3GPP), Mobile Competence Centre; France.

QUALCOMM, "Clarification of Network Initiated GPRS Detach Procedure", 3GPP Draft, May 31, 2001, vol. TSG CN, 3rd Generation Partnership Project (3GPP), Mobile Competence Centre; France.

Research in Motion, "IMEI Check and IMS", 3GPP Draft, Jan. 9, 2007, vol. SA WG2, 3rd Generation Partnership Project (3GPP), Mobile Competence Centre; France.

"Correction for Usage of Cancel Location for Supercharger", 3GPP Draft; C4-060646, 3rd Generation Partnership Project (3GPP), Mobile Competence Centre; Sophia Antipolis, France, vol. TSG-CT WG4 Meeting #31; May 12, 2006.

* cited by examiner ly, to a method and
METHOD AND SYSTEM FOR PREVENTING USE OF STOLEN TERMINAL THROUGH FORCED LOCATION RE-REGISTRATION

RELATED APPLICATIONS

The subject application is a U.S. National Stage application of International Application No. PCT/KR2008/007455, filed on 17 Dec. 2008, which claims the priority of Korean Patent Application No.: 10-2007-0133457, filed on 18 Dec. 2007, the contents of which are herein incorporated by reference in its entirety.

TECHNICAL FIELD

The present invention relates to a method and system for preventing the use of a stolen terminal through forced location re-registration, and more particularsystem for preventing the use of a stolen terminal when the stolen terminal registers its location again by making it inevitable for the stolen terminal to register its location again to be used.

BACKGROUND ART

The surge in the demand for communication services has resulted in the popularization of information and communication services and the introduction of various multimedia services and high-quality services. While the number of subscribers to mobile voice call services is reaching a saturation point, the number of subscribers to various additional services is increasing.

Global system for mobile communications (GSM), which is a second-generation (2G) communication network, and wideband code division multiple access (WCDMA), which is a third-generation (3G) mobile communication system, support 'terminal mobility' through a subscriber identity module (SIM) card or a universal subscriber identity module (USIM) card which is inserted into a terminal. Here, the term 'terminal mobility' refers to the capability of changing terminals by inserting a USIM card, which includes subscriber information, into any terminal which supports third-generation or next-generation mobile communication services. Therefore, instead of being restricted to a certain terminal, users can have terminal mobility, that is, freely change terminals by inserting their USIM card into desired terminals. A SIM or USIM card is a smart card inserted into a WCDMA terminal and has various functions such as user authentication, global roaming, and e-commerce. In an environment that supports terminal mobility, users can frequently change terminals by using their SIM card or USIM card. Thus, services that can be provided may depend on hardware specifications of each terminal. Terminal mobility in IP multimedia subsystem (IMS) network can be supported by using an ISIM (IP multimedia subscriber identity module) card.

Generally, a user inserts his or her SIM, USIM, or ISIM card into a user terminal and uses the user terminal. When the user turns on the user terminal, the user terminal begins its location registration, and an equipment identity register (EIR) authenticates the user terminal. If the user terminal is registered as a stolen terminal, the EIR does not allow the location registration of the user terminal.

However, when a user terminal is lost or stolen, it is often not immediately blacklisted after it was lost or stolen. It usually takes some time for a user of the user terminal to recognize and report that the user terminal was lost or stolen. Thus, a person, who obtained the user terminal in the meantime, can insert his or her SIM card into the user terminal and use the user terminal.

Since the EIR authenticates a user terminal when the user terminal is turned on after being turned off, if a person who stole the user terminal, which is turned on, does not turn off the user terminal, there is no way to prevent the person from using the user terminal.

In this regard, a method and system, which can prevent the use of a stolen terminal even when the stolen terminal remains turned on, is required.

DISCLOSURE OF INVENTION

Technical Problem

Aspects of the present invention provide a method and system for preventing a user terminal, which was being used in a communication network, from being used after the user terminal is stolen by making it inevitable for the stolen terminal to register its location again to be used.

However, aspects of the present invention are not restricted to the one set forth herein. The above and other aspects of the present invention will become more apparent to one of ordinary skill in the art to which the present invention pertains by referencing the detailed description of the present invention given below.

Technical Solution

According to an aspect of the present invention, there is provided a method of preventing the use of a stolen terminal through forced location re-registration. The method includes: receiving information that a user terminal was stolen; making a mobile application part (MAP) cancel location request to a mobile switching center (MSC) or a serving general packet radio service support node (SGSN) after receiving the information that the user terminal was stolen; and checking whether the user terminal is a stolen terminal when receiving a location registration approval request from the user terminal after performing a MAP cancel location process by deleting subscriber information of the user terminal from the MSC or the SGSN in response to the MAP cancel location request.

According to another aspect of the present invention, there is provided a method of preventing the use of a stolen user terminal, which includes a user card and user equipment, through forced location re-registration. The method includes: identifying a user of the stolen user terminal; making a MAP cancel location request to an MSC or an SGSN and performing a MAP cancel location process for the stolen user terminal by using the MSC or the SGSN; checking whether the user terminal was stolen when receiving a call request from the user terminal; and disapproving location registration of the user terminal when determining that the user terminal was stolen.

According to another aspect of the present invention, there is provided a system for preventing the use of a stolen terminal through forced location re-registration. The system includes: a theft report-receiving unit which receives information that a user terminal was stolen; a MAP cancel location-requesting unit which makes a MAP cancel location request to an MSC or an SGSN after receiving the information that the user terminal was stolen; and a location registration approval request-receiving unit which receives a location registration approval request when there is a call request from the user terminal after the MSC or the SGSN deleted subscriber information of the user terminal in response to the MAP cancel location request; and a stolen terminal-checking unit which checks whether the user terminal is a stolen terminal by performing a location registration approval process.

According to another aspect of the present invention, there is provided a system for preventing the use of a stolen terminal through forced location re-registration. The system includes: a subscriber database (DB) which manages subscriber information of a user terminal; a communication switching unit which connects a circuit communication path or a packet communication path in response to a call request from the user terminal; a MAP cancel location process-executing unit which performs a MAP cancel location process by deleting the subscriber information of the user terminal from the subscriber DB after receiving a message informing that the user terminal was stolen; and a control unit which informs the user terminal about the failure of a location registration approval process when receiving a location registration approval request from the stolen user terminal after the subscriber information of the user terminal was deleted.

BRIEF DESCRIPTION OF THE DRAWINGS

The above and other aspects and features of the present invention will become more apparent by describing in detail exemplary embodiments thereof with reference to the attached drawings, in which.

MODE FOR THE INVENTION

Figure 1:
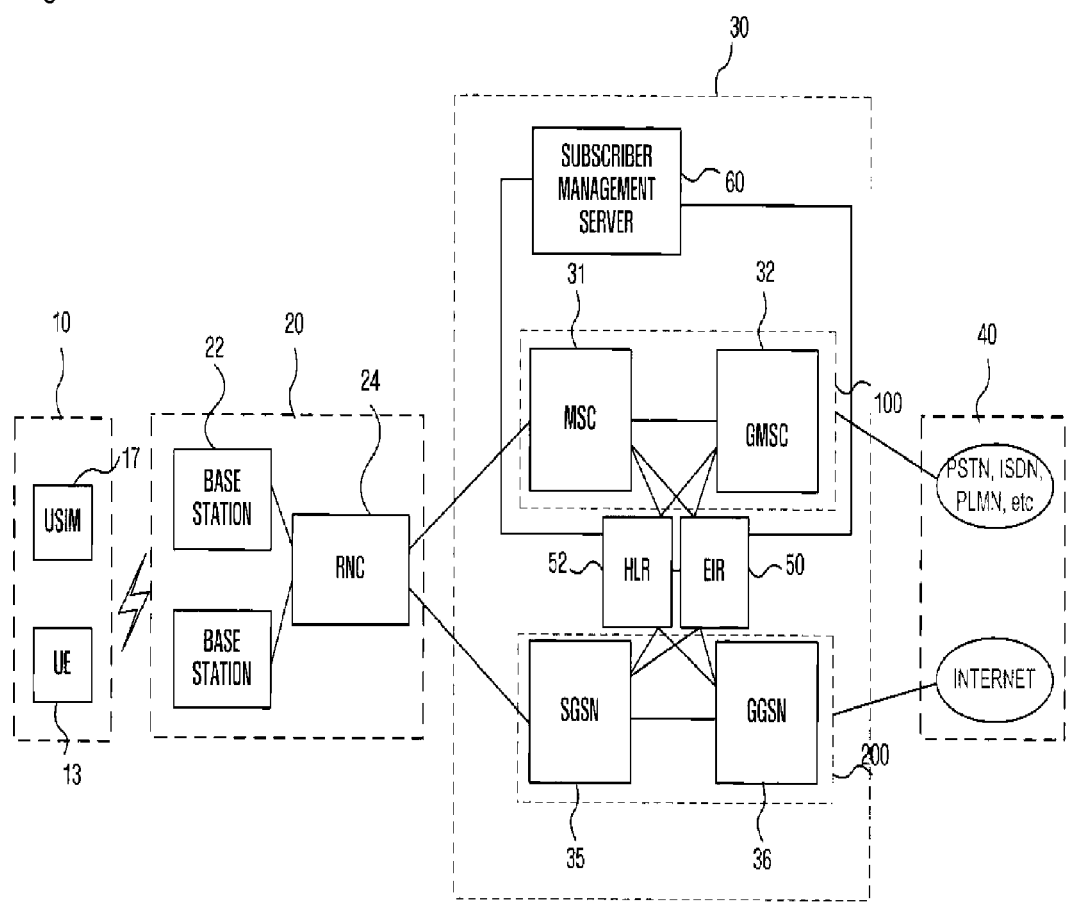
FIG. 1 is a block diagram of a universal mobile telecommunications system (UMTS) network according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in detail with reference to the accompanying drawings.

FIG. 1 is a block diagram of a universal mobile telecommunications system (UMTS) network according to an exemplary embodiment of the present invention. Referring to FIG. 1, the UMTS network according to the present embodiment may include a user terminal 10, a UMTS terrestrial radio access network (UTRAN) 20, and a core network 30 which is connected to the UTRAN 20 and responds to access from an external network 40. The UMTS network is also referred to as a public land mobile network (PLMN).

Examples of the user terminal 10 may include devices used for wireless communication and devices that can make wireless communications, such as a personal digital assistant (PDA) and a computer. The user terminal 10 may be fixed or mobile. The user terminal 10 may also be referred to as a mobile station (MS), a subscriber station (SS), a wireless device, or the like.

The user terminal 10 may include user equipment (UE) 13 and a UMTS subscriber identity module (USIM) card 17. In the exemplary embodiments of the present invention, SIM, USIM and ISIM card can be referred as "subscriber identity module (SIM) card". The UE 13 is hardware of the user terminal 10, and the SIM card 17 stores information about a user of the UE 13. For example, the SIM card 17 may be a subscriber identity module (SIM) card, a UMTS subscriber identity module (USIM) card, or an ISIM card.

Specifically, the user terminal 10 includes the UE 13, which is used for wireless communication through a UMTS user (Uu) interface, and the SIM card 17 which identifies a subscriber, performs an authentication algorithm, and stores authentication and encryption keys and subscriber information needed by the user terminal 10. Here, the Uu interface is a wireless interface used for wideband code division multiple access (WCDMA) mobile communications.

The UTRAN 20 includes one or more base stations 22, which meet a third-generation partnership project (3GPP) radio access standard to support WCDMA, and a radio network controller (RNC) 24. The UTRAN 20 transmits a call request signal received from the user terminal 10 to the core network 30.

Each of the base stations 22 sets a wireless physical channel, which is needed for data exchange with the user terminal 10, based on control information received from the RNC 24. Each of the base stations 22 converts data, which is received from an upper layer protocol of the RNC 24, into data suitable for a wireless environment and transmits the data suitable for the wireless environment to the user terminal 10. In addition, each of the base stations 22 transmits data received from the user terminal 10 to the upper layer protocol of the RNC 24. For data transmission in wireless sections, the base stations 22 support various wireless access technologies such as channel coding, interleaving, modulation, and demodulation. The base stations 22 are fixed stations which communicate with the user terminal 10. The base stations 22 may also be referred to as 'node-B's, base transceiver systems (BTS), access points, or the like. The RNC 24 dynamically allocates wireless resources of a wireless communication system and controls the base stations 22. The RNC 24 performs wired/wireless channel management, protocol matching of the user terminal 10, protocol matching of the base stations 22, soft handoff, protocol matching with the core network 30, general packet radio service (GPRS) access, failure management, system loading, and the like. The RNC 24 functions as an access point for services provided through the core network 30.

A mobile switching center (MSC) 31 of the core network 30 delivers signals to or from the base stations 22. In addition, the MSC 31 performs a switching function between mobile subscribers and between a mobile subscriber and a subscriber to a fixed network such as a public switched telephone network (PSTN) or an integrated services digital network (ISDN). The MSC 31 handles basic and additional services, signals transmitted to or received from the user terminal 10 by being linked to existing or other networks, and location registration and hand off. The MSC 31 may include a visitor location register (VLR) which temporarily stores subscriber information, such as location information of the user terminal 10, in order to handle calls from subscribers.

A gateway mobile switching center (GMSC) 32 of the core network 30 is a gateway which is connected to the external network 40 by the MSC 31. All circuit-switched connections are made through the GMSC 32.

The MSC 31 and the GMSC 32 may collectively be referred to as a circuit switching unit 100, and the circuit switching unit 100 creates a communication path to the user terminal 10 through circuit-switched connections.

A serving GPRS support node (SGSN) 35 manages the mobility of the user terminal 10 for GPRS service, manages sessions for handling outgoing/incoming calls and transmitting/receiving packet data, and supports authentication and billing functions. In addition, the SGSN 35 routes packet data. The SGSN 35 may include a VLR which temporarily stores subscriber information, such as location information of the user terminal 10.

A gateway GPRS support node (GGSN) 36 of the core network 30 is a serving node of an Internet protocol (IP)-based packet network which provides high-speed packet data service for GPRS data service. The GGSN 36 manages sessions for packet data service, routes packet data, and provides an interface for connecting a WCDMA network and an Internet network.

The SGSN 35 and the GGSN 36 may collectively be referred to as a packet switching unit 200. The packet switching unit 200 controls the user terminal 10 to transmit or receive data in units of packets.

The MSC 31 or the SGSN 35 is a component which connects a circuit or packet communication path. While the UMTS network is described as an example, the present invention is not limited thereto. That is, the present invention may also include a component such as a call session control function (CSCF) which connects a circuit or packet communication path in an IP multimedia subsystem (IMS) network or other next-generation communications networks to the external network 40.

The core network 30 is connected to the external network 40 by the circuit switching unit 100 or the packet switching unit 200. The circuit switching unit 100 is related to circuit-based transmission and reception, such as voice calls. The circuit switching unit 100 may be a PSTN, an ISDN, or a PLMN. The packet switching unit 200 is related to packet transmission and reception. The packet switching unit 200 may be an IP network such as Internet.

A home location register (HLR) 52 of the core network 30 stores and manages location information of subscribers, and an authentication center (AuC) generates an authentication vector and verifies the identity of a subscriber. Generally, the AuC is linked to the HLR 52 and exchanges information with the HLR 52.

An equipment identity register (EIR) 50 checks or manages identification information related to hardware of the user terminal 10. The EIR 50 stores information about stolen or lost terminals. When requested to verify the identity of a subscriber and approve location registration of the user terminal 10, the EIR 50 compares information about the user terminal 10, which is received from the MSC 31, with information stored therein to determine whether the user terminal 10 is a stolen or lost terminal. To do this, the EIR 50 stores a black list of stolen or lost terminals.

A subscriber management server 60 informs the EIR 50 or the HLR 52 that the user terminal 10 was stolen. That is, once a stolen terminal is registered, the subscriber management server 60 informs the EIR 50 or the HLR 52 about the stolen terminal.

Figure 2:
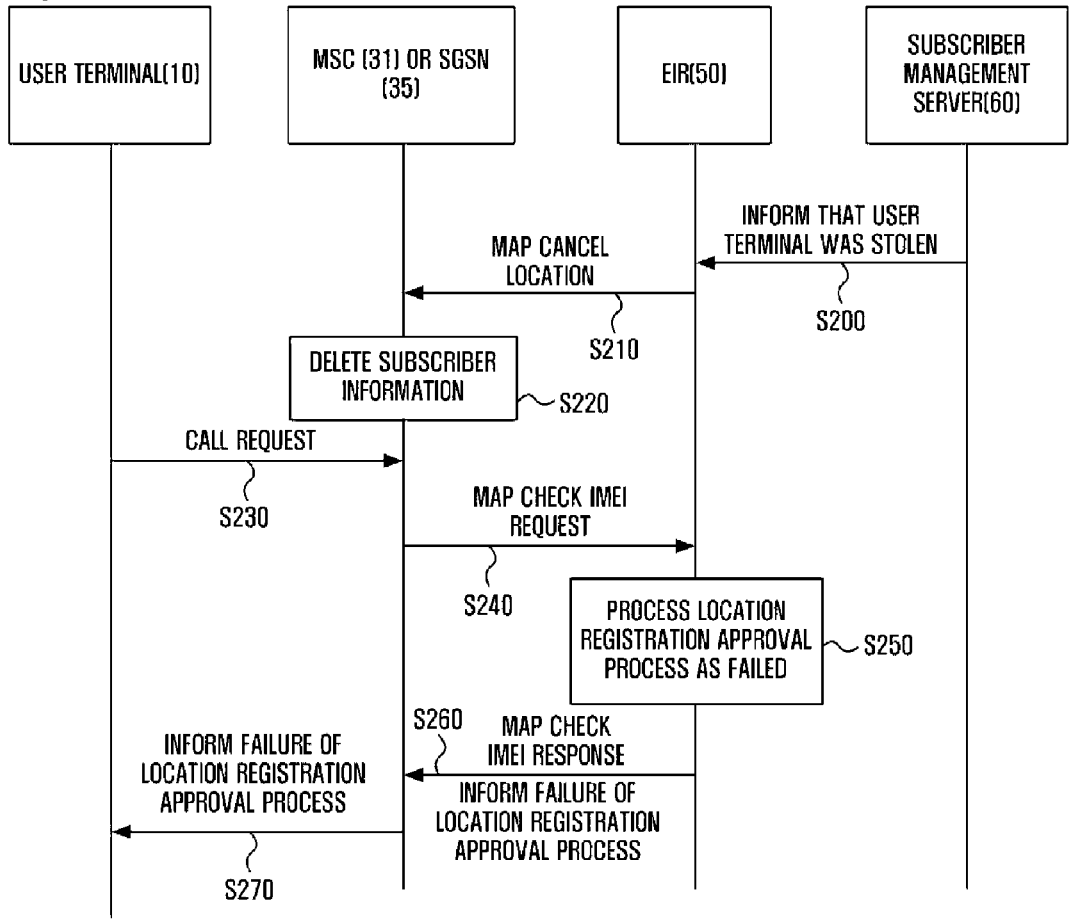
FIG. 2 is a flowchart illustrating a method of preventing the use of a stolen terminal through forced location re-registration according to an exemplary embodiment of the present invention.
Figure 3:
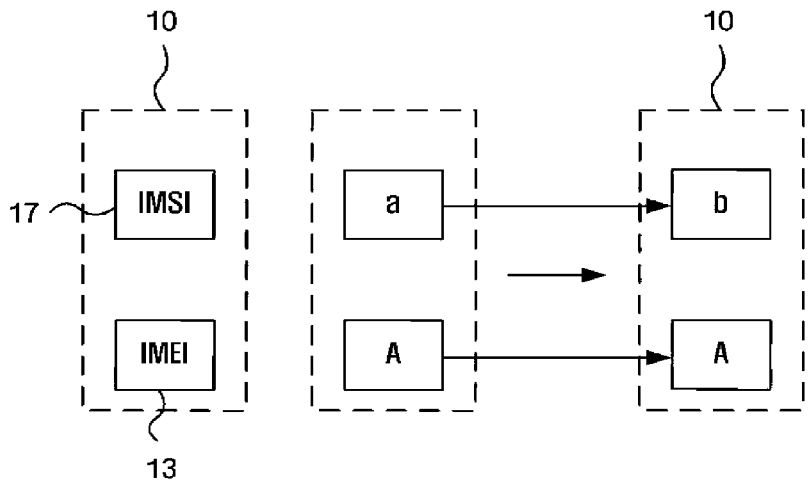
FIG. 3 illustrates an example in which information stored in a user terminal is changed after the user terminal is stolen.

FIG. 2 is a flowchart illustrating a method of preventing the use of a stolen terminal through forced location re-registration according to an exemplary embodiment of the present invention. FIG. 3 illustrates an example in which information stored in the user terminal 10 is changed after the user terminal 10 is stolen.

Referring to FIG. 2, the subscriber management server 60 informs the EIR 50 that the user terminal 10 was stolen (operation S200). When informing the EIR 50 that the user terminal 10 was stolen, the subscriber management server 60 transmits international mobile equipment identity (IMEI) information of the user terminal 10 to the EIR 50.

For example, referring to FIG. 3, the user terminal 10 may store IMEI information, which is device information used to identify the UE 13 of the user terminal 10, and international mobile subscriber identity (IMSI) information which is information about a user of the user terminal 10. The IMEI information describes the UE 13 of the user terminal 10. Specifically, the IMEI information describes the manufacturer, model, and serial number of the UE 13 of the user terminal 10. The IMEI information may include a type approval code (TAC), a final assembly code (FAC), and a serial number (SNR).

The IMSI information is used to identify a subscriber to a mobile communication network and stored in the SIM card 17 (such as a SIM card, USIM card or an ISIM card). Since the IMSI information includes information unique to a user or a subscriber, it may be replaced by temporary mobile subscriber identity (TMSI) information for security reasons.

For example, a current user of the user terminal 10 may be 'a', and the UE 13 of the user terminal 10 may be 'A'. That is, the IMSI information which is used to identify the user of the user terminal 10 and stored in the SIM card 17 (such as a SIM card, USIM card or an ISIM card) may be 'a', and the IMEI information which is used to identify the UE 13 of the user terminal 10 may be 'A'. In this case, the user terminal 10 may be defined as a combination of the IMSI information and the IMEI information, that is, 'a/A'.

However, when the user terminal 10 is stolen, the combination of the IMSI information and the IMEI information of the user terminal 10 may be changed to 'b/A'. Specifically, a person (i.e., a thief), who stole the user terminal 10 or obtained the user terminal 10 which had been lost, may insert his or her SIM card into the user terminal 10 in order to use the user terminal 10. When IMSI information stored in the SIM card of the person who stole the user terminal 10 is 'b', the user terminal 10 may be defined as 'b/A'.

Thus, if the combination of the IMSI information and the IMEI information of the user terminal 10 is changed from 'a/A' to 'b/A,' it indicates that the current user of the user terminal 10 (i.e., 'A') has been changed from 'a' to 'b'.

Referring back to FIG. 2, after being informed that the user terminal 10 was stolen, the EIR 50 makes a mobile application part (MAP) cancel location request to the MSC 31 or the SGSN 35 to perform a MAP cancel location process (operation S210). As used herein, the term 'MAP cancel location process' denotes deleting subscriber information, that is, a subscriber's identification information including location information, from the MSC 31 or the SGSN 35.

In response to the MAP cancel location request, the MSC 31 or the SGSN 35 performs the MAP cancel location process by deleting, from the VLR stored therein, subscriber information which includes location information of a user who is using a mobile communication network through the MSC 31 or the SGSN 35 (operation S220). Generally, the MAP cancel location process refers to the process of forcibly deleting subscriber (user) information from a VLR. Thus, after the MAP cancel location process, the user terminal 10 must register its location again.

There may be a call request from the user terminal 10 some time after the MAP cancel location process (operation S230). In this case, the MSC 31 or the SGSN 35 retrieves location registration information of the user terminal 10 and, when no location registration information of the user terminal 10 is available, makes a location registration approval request to the EIR 50 so that the EIR 50 performs a location registration approval process for the user terminal 10 (operation S240). Here, the location registration approval process refers to the process of determining whether location information of the user terminal 10, which made the call request, can be provided and determining whether the user terminal 10 can be used in a communication network by verifying the identity of the user and the UE 13 of the user terminal 10.

A call request according to an embodiment of the present invention may be understood as a request for the transmission of a wireless communication service from the user terminal 10. A call request according to an embodiment of the present invention may be understood as making a service request to the MSC 31 or the SGSN 35 to receive a wireless communication service. Examples of the call request may include requests for provision of a call service and transmission of short messages through the MSC 31 and requests for data transmission/reception and multimedia message transmission/reception through the SGSN 35. In addition, examples of the call request may include responses to calls or messages received from other users or to data packets received from a data server. The user terminal 10 may respond to a service request from the MSC 31 or the SGSN 35 at a receiving end in order to be allocated with wireless resources for receiving a service, and such a response may be referred to as a 'call request' in a broad sense.

Generally, when there is a call request from the user terminal 10, there is no need for the location registration approval process since the MSC 31 or the SGSN 35 retains information about the user terminal 10, such as the location information of the user terminal 10. However, as in the present embodiment, when a thief who stole the user terminal 10 inserts his or her SIM card into the stolen user terminal 10 to use the user terminal 10, the location registration approval process must be performed to prevent the thief from using the user terminal 10.

For example, if the EIR 50 has already performed the MAP cancel location process for the user terminal 10, the thief must obtain approval for location registration of the user terminal 10 again to make a call by using the user terminal 10. Here, the EIR 50 performs the location registration approval process (operation S250). In the location registration approval process, the EIR 50 receives the IMEI information, which is device information of the user terminal 10, to determine whether the user terminal 10 is a stolen terminal (operation S250).

The EIR 50 may compare the IMEI information (i.e., device information) of the user terminal 10 with a black list of terminals registered as stolen and determine whether the user terminal 10 is a stolen terminal. Alternatively, when the IMSI information and the IMEI information of the user terminal 10 are changed and when the subscriber management server 60 informs the EIR 50 that the user terminal 10 was stolen, the EIR 50 may determine that the user terminal 10 is a stolen terminal.

When determining that the user terminal 10 making the call request is a stolen terminal, the EIR 50 processes the location registration approval process as failed (that is, disapprove the location registration of the user terminal 10) (operation S250). Once the location registration approval process is processed as failed, the user terminal 10, which made the call request, cannot register its location with a communication network. Therefore, the thief who stole the user terminal 10 can be easily prevented from using the user terminal 10.

When the location registration approval process is processed as failed, the EIR 50 informs the MSC 31 or the SGSN 35 about the failure of the location registration approval process (operation S260). Accordingly, the MSC 31 or the SGSN 35 informs the user terminal 10 about the failure of the location registration approval process (operation S270). Due to the failure of the location registration approval process, the user terminal 10 is not supported in the communication network and thus cannot be used.

Figure 4:
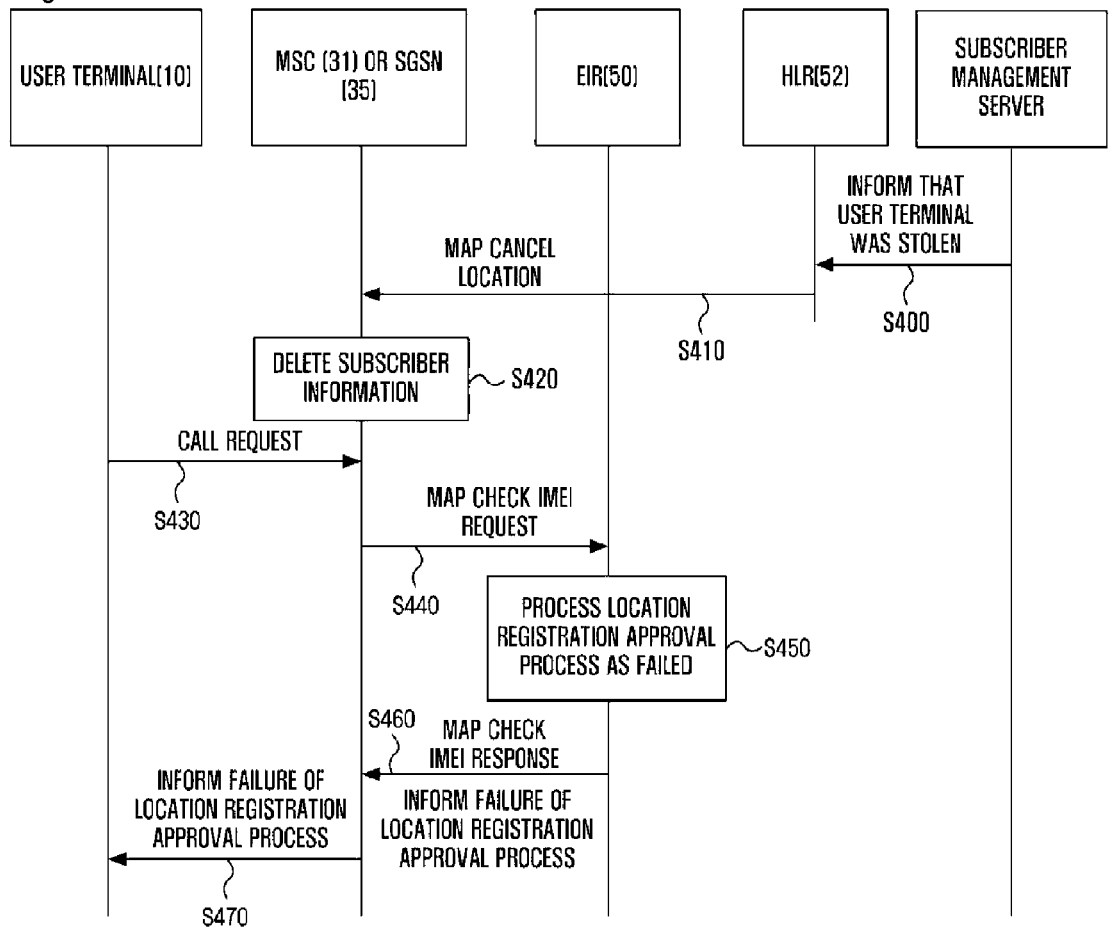
FIG. 4 is a flowchart illustrating a method of preventing the use of a stolen terminal through forced location re-registration according to another exemplary embodiment of the present invention.

FIG. 4 is a flowchart illustrating a method of preventing the use of a stolen terminal through forced location re-registration according to another exemplary embodiment of the present invention.

Referring to FIG. 4, the subscriber management server 60 informs the HLR 52 that the user terminal 10 was stolen (operation S400). The HLR 52 manages information about home subscribers. When the subscriber management server 60 informs the HLR 52 that the user terminal 10 was stolen, the HLR 52 takes a proper measure.

That is, after being informed that the user terminal 10 was stolen, the HLR 52 makes a MAP cancel location request to the MSC 31 or the SGSN 35 to perform a MAP cancel location process (operation S410). Generally, the MAP cancel location process refers to the process of forcibly deleting subscriber (user) information from a VLR. Thus, after the MAP cancel location process, the user terminal 10 must register its location again.

In response to the MAP cancel location request, the MSC 31 or the SGSN 35 performs the MAP cancel location process by deleting subscriber information of the user terminal 10 from the VLR stored therein (operation S420). Since the subscriber information of the stolen terminal 10 is deleted, the location of the user terminal 10 must be registered and authenticated again so that the user terminal 10 can be used in a communication network.

A thief who stole the user terminal 10 may insert his or her SIM card into the user terminal 10 and make a call request (operation S430). In response to the call request, the MSC 31 or the SGSN 35 makes a location registration approval request (operation S440). Here, the MSC 31 or the SGSN 35 may request the EIR 50 to perform a location registration approval process based on IMEI information (i.e., device information) of the user terminal 10. Alternatively, the MSC 31 or the SGSN 35 may request the EIR 50 to perform the location registration approval process based on the IMEI information (i.e., device information) and IMSI information (i.e., user (subscriber) information) of the user terminal 10.

In response to the location registration approval request, the EIR 50 obtains the IMEI information of the user terminal 10 and determines whether the user terminal 10 is a stolen terminal (operation S450). When determining that the user terminal 10 is a stolen terminal, the EIR 50 processes the location registration approval process as failed. Thus, the user terminal 10 cannot be used in the communication network.

In addition, the EIR 50 informs the MSC 31 or the SGSN 35 about the failure of the location registration approval process (operation S460), and the MSC 31 or the SGSN 35 also informs the user terminal 10 about the failure of the location registration approval process (operation S470).

As described above, since the subscriber information of the stolen terminal 10 is deleted in the MAP cancel location process and thus the stolen terminal 10 is forced to register its location again, the stolen terminal 10 can be prevented from using the infrastructure of the communication network. That is, the use of the stolen terminal 10 can be easily prevented by using the message of "MAP cancel location".

Figure 5:
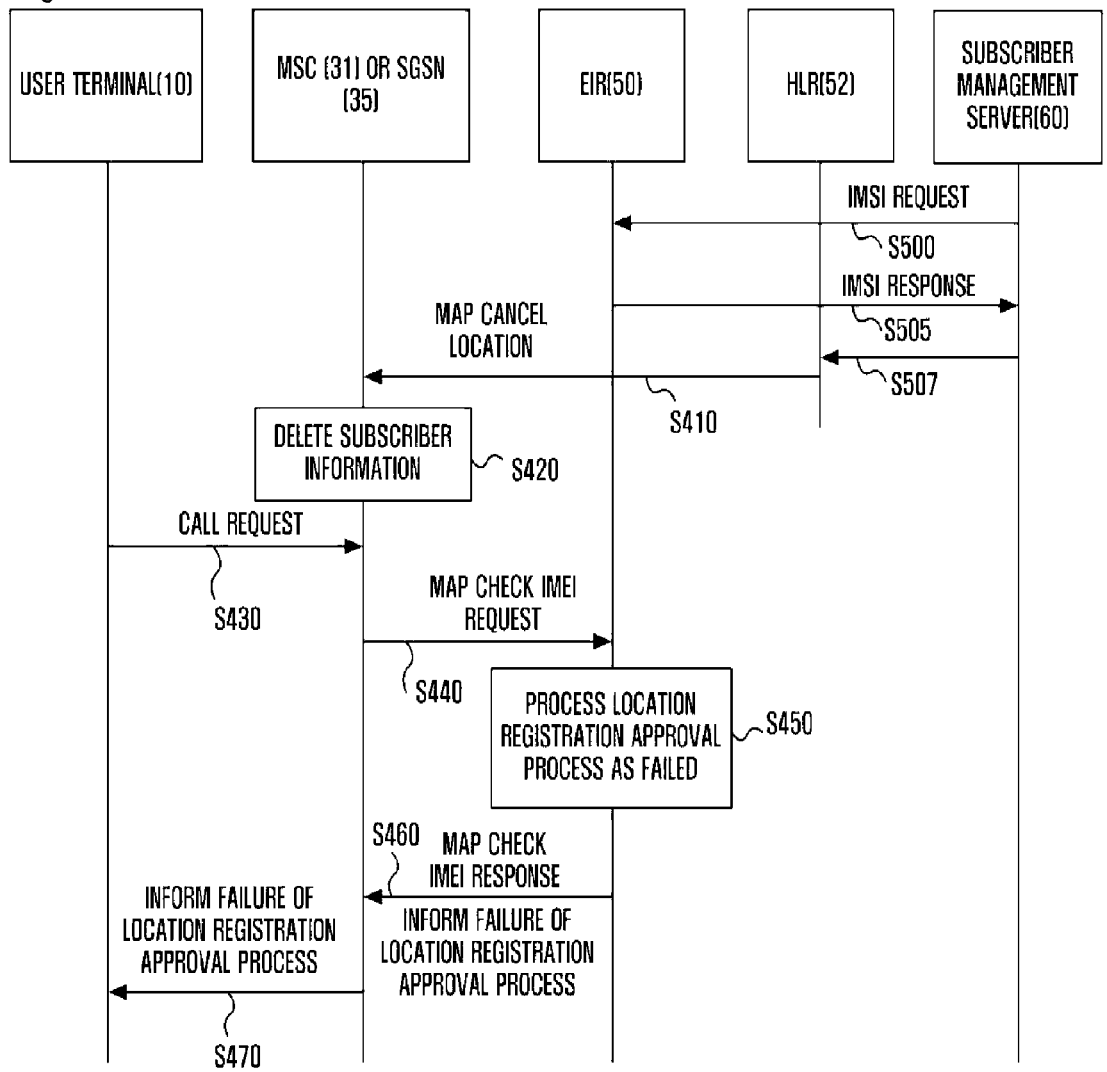
FIG. 5 is a flowchart illustrating a method of preventing the use of a stolen terminal through forced location re-registration according to another exemplary embodiment of the present invention.

FIG. 5 is a flowchart illustrating a method of preventing the use of a stolen terminal through forced location re-registration according to another exemplary embodiment of the present invention.

Referring to FIG. 5, the subscriber management server 60 requests the EIR 50 to provide IMSI information of the user terminal 10 (operation S500). When the user terminal 10 was stolen, the subscriber management server 60 provides the IMEI information of the UE 13 of the stolen terminal 10 to the EIR 50 and requests the EIR 50 to provide IMSI information stored in a SIM card of a thief who stole the user terminal 10 (i.e., the UE 13). Then, the EIR 50 transmits the IMSI information, which is stored in the SIM card of the thief, to the subscriber management server 60 (operation S505).

When determining, based on the received IMSI information, that a SIM card of a person who is not the original user of the user terminal 10 was inserted into the user terminal 10 to use the user terminal 10 (i.e., the UE 13), the subscriber management server 60 informs the HLR 52 that the user terminal 10 is a stolen terminal (operation S507).

After being informed that the user terminal 10 is a stolen terminal, the HLR 52 makes a MAP cancel location request to the MSC 31 or the SGSN 35 (operation S410). Accordingly, the subscriber information of the user terminal 10 is deleted, and thus the user terminal 10 is forced to register its location again. Since the location re-registration process is identical to the location re-registration process described above in the previous embodiment, a detailed description thereof will be omitted.

As described above, IMSI information of a SIM card inserted into the user terminal 10 is checked. Then, when the IMSI information is different from the original IMSI information stored in the SIM card 17 of the user terminal 10, the UE 13 of the user terminal 10 is forced to register its location again. Therefore, when a person steals the user terminal 10, removes the SIM card 17 of the original user from the user terminal 10, and then inserts his or her SIM card (such as a SIM card, USIM card or an ISIM card) into the UE 13 of the user terminal 10 to use the user terminal 10, the person can be prevented from using the UE 13 of the user terminal 10.

Figure 6:
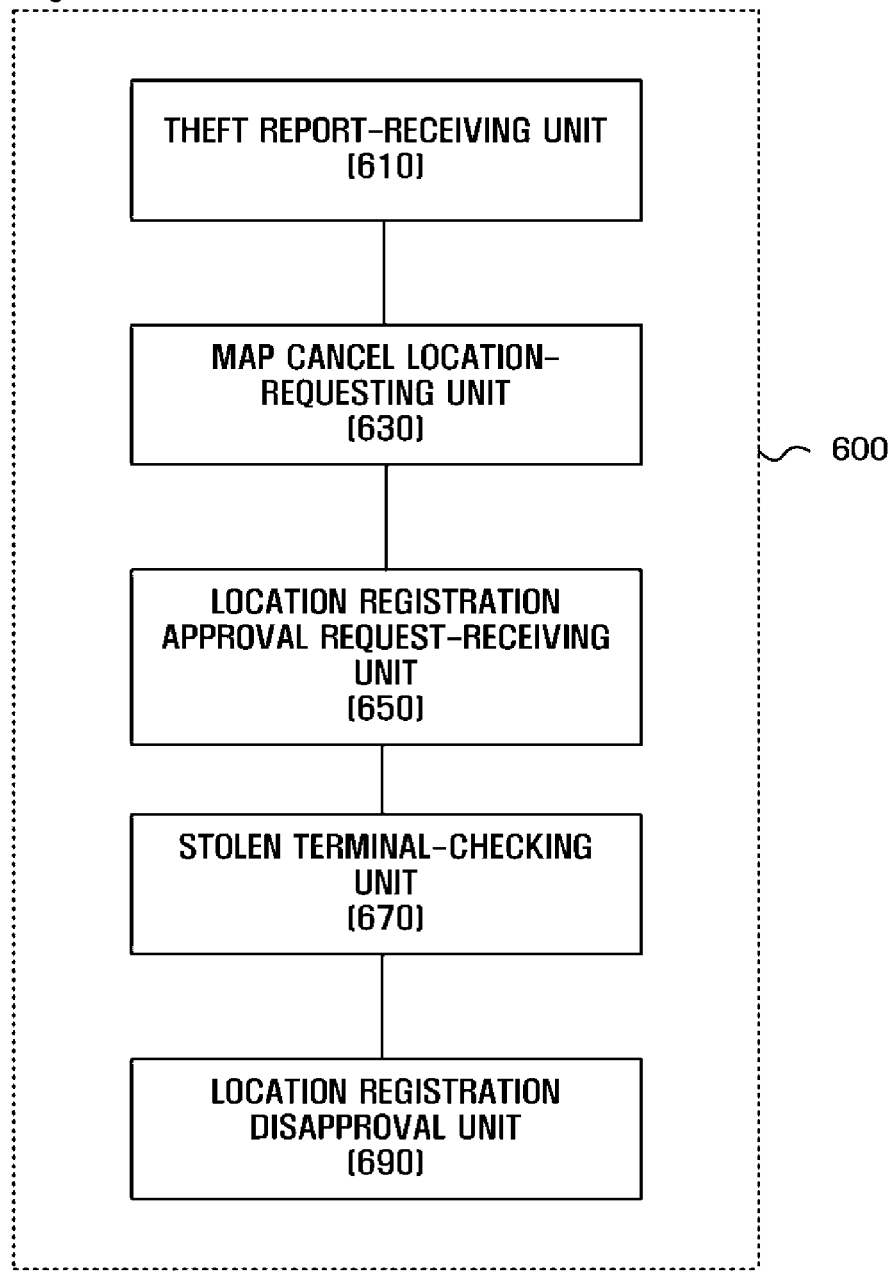
FIG. 6 is a block diagram of a system for preventing the use of a stolen terminal through forced location re-registration according to an exemplary embodiment of the present invention.

FIG. 6 is a block diagram of a system 600 for preventing the use of a stolen terminal through forced location re-registration according to an exemplary embodiment of the present invention.

Referring to FIG. 6, the system 600 according to the present embodiment includes a theft report-receiving unit 610, a MAP cancel location-requesting unit 620, a location registration approval request receiving unit 650, a stolen terminal-checking unit 670, and a location registration disapproval unit 690.

The theft report-receiving unit 610 is informed by the subscriber management server 60 or other computer networks that the user terminal 10 was stolen. When a theft incident is reported to the subscriber management server 60, the subscriber management server 60 may automatically report the theft incident to the theft report-receiving unit 610 of the system 600.

The MAP cancel location-requesting unit 630 makes a MAP cancel location request to the MSC 31 or the SGSN 35 to perform a MAP cancel location process. The MAP cancel location process refers to the process of forcibly deleting subscriber information of the user terminal 10 from the MSC 31 or the SGSN 35 or forcibly deleting the subscriber information of the user terminal 10 from a VLR which is connected to the MSC 31 or the SGSN 35. In response to the MAP cancel location request from the MAP cancel location-requesting unit 630, the subscriber information in the MSC 31 or the SGSN 35 is forcibly deleted.

When there is a call request from the user terminal 10, the location registration approval request-receiving unit 650 receives a location registration approval request if no subscriber information of the user terminal 10 is available in the MSC 31 or the SGSN 35. When it is informed that the user terminal 10 was stolen, the subscriber information of the user terminal 10 is deleted from the MSC 31 or the SGSN 35 through the MAP cancel location process. Therefore, when there is a call request from the user terminal 10, the user terminal 10 is forced to register its location again. Accordingly, the location registration approval request-receiving unit 650 receives the location registration approval request to force the user terminal 10 to register its location again.

In response to the location registration authentication request, the stolen terminal-checking unit 670 checks whether the user terminal 10 is a stolen terminal. Here, the EIR 50 checks whether the user terminal 10 is a stolen terminal by using IMEI information which is received from the user terminal 10.

When the stolen terminal-checking unit 670 determines that the user terminal 10 is a stolen terminal, the location registration disapproval unit 690 disapproves the location registration of the user terminal 10. As a result, the user terminal 10 cannot register its location with a communication network and thus cannot be used in the communication network.

Each component or unit used in embodiments of the present invention may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components or units may be composed of a combination of the software and hardware components. The components or units may be reside on a computer-readable storage medium or may be distributed over a plurality of computers.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

INDUSTRIAL APPLICABILITY

Since a person who stole the user terminal 10 is forced to register the location of the user terminal 10 again to use the user terminal 10, he or she can be prevented from using the infrastructure of the communication network by using the user terminal 10. That is, the use of the stolen terminal 10 can be easily prevented by using the message of 'MAP cancel location'.

The invention claimed is:

1. A method of preventing the use of a stolen user terminal through forced location re-registration, the method comprising:
   receiving information that a user terminal was stolen from a subscriber management server;
   making a mobile application part (MAP) cancel location request of the stolen user terminal to at least one of a mobile switching center (MSC) and a serving general packet radio service support node (SGSN) in response to receipt of the information of the stolen user terminal from the subscriber management server; and
   checking whether a user terminal is a stolen terminal when receiving a location registration approval request from at least one of the MSC and the SGSN for the user terminal after performing a MAP cancel location process in response to the MAP cancel location request,
   wherein the step of the checking whether a user terminal is a stolen terminal includes comparing, by an equipment identity register (EIR), data about the user terminal received from the at least one of the MSC and the SGSN with information about a list of stolen terminals stored in the EIR to determine whether the user terminal is the stolen terminal.

2. The method of claim 1, wherein the MAP cancel location process comprises deleting location information of the user terminal.

3. The method of claim 1, wherein the MAP cancel location process comprises deleting the subscriber information of the user terminal from a visitor location register (VLR) of the at least one of the MSC and the SGSN.

4. The method of claim 1, wherein an equipment identity register (EIR) performs a location registration approval process in response to the location registration approval request.

5. The method of claim 1, wherein whether the user terminal is a stolen terminal is checked based on international mobile equipment identity (IMEI) information of the user terminal.

6. The method of claim 1, wherein the checking of whether the user terminal is a stolen terminal comprises disapproving location registration of the user terminal to prevent the use of the user terminal.

7. The method of claim 1, wherein the information of the stolen user terminal is reported to a home location register (HLR), and the HLR makes the MAP cancel location request.

8. The method of claim 1, wherein the information of the stolen user terminal is received when a user card of a user, who is different from an original user of the user terminal, is inserted into the user terminal to use the user terminal after a theft report of the user terminal was received from the subscriber management server.

9. A method of preventing the use of a stolen user terminal, which comprises a user card and user equipment, through forced location re-registration, the method comprising:
   identifying a user of the stolen user terminal;
   making a MAP cancel location request of the stolen user terminal to at least one of an MSC and an SGSN in response to receipt of information of the stolen user terminal from a subscriber management server;
   performing, by the at least one of the MSC and the SGSN, a MAP cancel location process for the stolen user terminal;
   checking whether the user terminal was stolen when receiving a call request from the user terminal; and
   disapproving location registration of the user terminal when determining that the user terminal was stolen,
   wherein the step of the checking whether the user terminal was stolen includes comparing, by an equipment identity register (EIR), data about the user terminal received from the at least one of the MSC and the SGSN with information about a list of stolen terminals stored in the EIR to determine whether the user terminal is the stolen terminal.

10. The method of claim 9, wherein an EIR checks whether the user terminal was stolen based on IMEI information of the stolen user terminal.

11. The method of claim 9, wherein whether the user terminal was stolen is checked based on international mobile subscriber identity (IMSI) information which is subscriber information stored in a user card that is inserted into the stolen user terminal.

12. The method of claim 9, wherein the MAP cancel location process comprises deleting the subscriber information of the user terminal from a VLR of the at least one of the MSC and the SGSN.

13. A system for preventing the use of a stolen user terminal through forced location re-registration, the system comprising:
   a theft report-receiving unit configured to receive information that a user terminal was stolen from a subscriber management server;
   a MAP cancel location-requesting unit configured to make a MAP cancel location request of the stolen user terminal to at least one of an MSC and an SGSN in response to receipt of the information of the stolen user terminal from a subscriber management server; and
   a location registration approval request-receiving unit configured to receive a location registration approval request from the at least one of the MSC and the SGSN when there is a call request from the user terminal after the at least one of the MSC and the SGSN deleted subscriber information of the user terminal in response to the MAP cancel location request; and
   a stolen terminal-checking unit configured to check whether the user terminal is a stolen terminal by performing a location registration approval process,
   wherein an equipment identity register (EIR) is configured to compare data about the user terminal received from the at least one of the MSC and the SGSN with information about a list of stolen terminals stored in the EIR to determine whether the user terminal is the stolen terminal.

14. The system of claim 13, further comprising a location registration disapproval unit configured to disapprove location registration of the user terminal to prevent the use of the user terminal when the user terminal is a stolen terminal.

15. The system of claim 13, wherein the theft report-receiving unit receives a theft report of the user terminal from the subscriber management server.

16. A system for preventing the use of a stolen user terminal through forced location re-registration, the system comprising:
   a subscriber database (DB) configured to store subscriber information of a user terminal;
   a communication switching unit configured to connect a circuit communication path or a packet communication path in response to a call request from a user terminal;
   a MAP cancel location process-executing unit configured to perform a MAP cancel location process of a stolen user terminal by deleting the subscriber information of the user terminal from the subscriber DB in response to receipt of a message informing that the user terminal was stolen from a subscriber management server; and a control unit configured to inform the user terminal about the failure of a location registration approval process when receiving a location registration approval request from the MAP cancel location process-executing unit for the stolen user terminal after the subscriber information of the user terminal was deleted, wherein an equipment identity register (EIR) is configured to compare data about the user terminal received from at least one of a mobile switching center (MSC) and a serving general packet radio service support node (SGSN) with information about a list of stolen terminals stored in the EIR to determine whether the user terminal is the stolen terminal.

17. The system of claim 16, wherein at least one of a switching unit, an SGSN, and a call session control function (CSCF) comprises the subscriber DB, the communication switching unit, the MAP cancel location process-executing unit, and the control unit.

18. The system of claim 16, wherein the location registration approval request is received for the stolen user terminal when a call is to be received or sent from or to the stolen user terminal.

19. The system of claim 16, wherein the control unit receives from an EIR a message informing that the location registration approval process for the stolen user terminal failed and sends the message to the stolen user terminal.

20. The system of claim 16, wherein the control unit checks whether the user terminal was stolen based on IMEI information of the user terminal.

* * * * *